(12) United States Patent
Harmon et al.

(10) Patent No.: US 12,054,030 B2
(45) Date of Patent: Aug. 6, 2024

(54) HEATING, VENTILATION, AND AIR CONDITIONING ASSEMBLY FOR VEHICLE ROOF

(71) Applicant: Ford Global Technologies, LLC, Dearborn, MI (US)

(72) Inventors: Michael John Harmon, Westland, MI (US); Hussain Zoher Tajmahal, Detroit, MI (US); Marielle Beverly Conrad, Detroit, MI (US); Yejin Han, Detroit, MI (US); David Earl Ooms, Canton, MI (US); Michael Moliterno, Chicago, IL (US); Andrew Smith, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/114,507

(22) Filed: Feb. 27, 2023

(65) Prior Publication Data
US 2023/0219399 A1 Jul. 13, 2023

Related U.S. Application Data

(63) Continuation of application No. 17/195,829, filed on Mar. 9, 2021, now Pat. No. 11,623,495.

(51) Int. Cl.
*B60H 1/32* (2006.01)
*B60H 1/00* (2006.01)
(Continued)

(52) U.S. Cl.
CPC ..... *B60H 1/00207* (2013.01); *B60H 1/00392* (2013.01); *B60H 1/245* (2013.01);
(Continued)

(58) Field of Classification Search
CPC ............ B60H 1/00207; B60H 1/00392; B60H 1/245; B60H 1/26; B60H 1/3229; B60H 2001/00235
See application file for complete search history.

(56) References Cited

U.S. PATENT DOCUMENTS 5,791,156 A 8/1998 Strautman et al.
6,295,826 B1 * 10/2001 Lee ................... B60H 1/00542
62/244
(Continued)

FOREIGN PATENT DOCUMENTS

CZ 28366 U1 7/2015
EP 1342598 A1 11/2006
(Continued)

*Primary Examiner* — Emmanuel E Duke
(74) *Attorney, Agent, or Firm* — Vichit Chea; Price Heneveld LLP

(57) ABSTRACT

A vehicle roof assembly includes a roof that defines an aperture. A heating, ventilation, and air conditioning assembly is selectively disposed within the aperture. The heating, ventilation, and air conditioning assembly includes a housing defining an interior. The housing defines an intake and a vent opening. The intake is defined on a first side of the housing. A fan is disposed within the interior on a second side of the housing. The second side opposes the first side. A duct is disposed within the interior. The duct extends between the first side and the second side of the housing. The duct fluidly couples the intake with the vent opening.

18 Claims, 12 Drawing Sheets

(51) Int. Cl.
 B60H 1/24 (2006.01)
 B60H 1/26 (2006.01)
(52) U.S. Cl.
 CPC ............. B60H 1/26 (2013.01); B60H 1/3229 (2013.01); *B60H 2001/00235* (2013.01)

(56) References Cited

U.S. PATENT DOCUMENTS

| | | | |
|---|---|---|---|
| 6,780,097 B2 * | 8/2004 | Shuttleworth | B60H 1/245 |
| | | | 454/158 |
| 6,868,900 B2 | 3/2005 | Dage et al. | |
| 7,334,834 B2 | 2/2008 | Hill et al. | |
| 10,173,561 B2 | 1/2019 | Cho et al. | |
| 10,266,031 B2 | 4/2019 | Steinman et al. | |
| 2003/0168267 A1 | 9/2003 | Borroni-Bird et al. | |
| 2007/0205633 A1 * | 9/2007 | Waco | B62D 33/0617 |
| | | | 296/190.09 |
| 2009/0318069 A1 | 12/2009 | Konet | |
| 2013/0207420 A1 * | 8/2013 | Kumar | B60H 1/00564 |
| | | | 296/217 |
| 2019/0351731 A1 | 11/2019 | Jeong | |
| 2020/0376920 A1 * | 12/2020 | Harper | H01M 10/625 |

FOREIGN PATENT DOCUMENTS

| | | | | |
|---|---|---|---|---|
| EP | 2112010 A1 * | 10/2009 | ......... | B60H 1/00378 |
| TR | 201105829 U | 10/2011 | | |
| WO | 2015065495 A1 | 5/2015 | | |

\* cited by examiner

HEATING, VENTILATION, AND AIR CONDITIONING ASSEMBLY FOR VEHICLE ROOF

CROSS-REFERENCE TO RELATED APPLICATIONS

This application is a continuation of U.S. patent application Ser. No. 17/195,829, filed on Mar. 9, 2021, now U.S. Pat. No. 11,623,495, entitled HEATING, VENTILATION, AND AIR CONDITIONING ASSEMBLY FOR VEHICLE ROOF, the entire disclosure of which is hereby incorporated herein by reference.

FIELD OF THE DISCLOSURE

The present disclosure generally relates to a heating, ventilation, and air conditioning (HVAC) assembly. More specifically, the present disclosure relates to an HVAC assembly for a vehicle roof.

BACKGROUND OF THE DISCLOSURE

Vehicles may include an HVAC system for treating air that is directed into a passenger cabin of the vehicle. The HVAC system generally directs air from external to the vehicle and expels the air into the passenger cabin after treating the air. The HVAC system may also recirculate air from the passenger cabin to the passenger cabin after treating the air.

SUMMARY OF THE DISCLOSURE

According to at least one aspect of the present disclosure, a vehicle roof assembly includes a roof that defines an aperture. A heating, ventilation, and air conditioning assembly is selectively disposed within the aperture. The heating, ventilation, and air conditioning assembly includes a housing defining an interior. The housing defines an intake and a vent opening. The intake is defined on a first side of the housing. A fan is disposed within the interior on a second side of the housing. The second side opposes the first side. A duct is disposed within the interior. The duct extends between the first side and the second side of the housing. The duct fluidly couples the intake with the vent opening.

According to another aspect of the present disclosure, a heating, ventilation, and air conditioning unit for a vehicle roof includes a housing having an inner perimeter that defines a central opening. The housing defines an intake and a vent opening. A sunroof is disposed within the central opening. The vent opening is defined by the inner perimeter of the housing proximate to the sunroof. A fan is disposed within the housing and is configured to draw air from the intake through an interior of the housing. A duct extends through the interior of the housing and around the sunroof. The duct defines an outlet in fluid communication with the vent opening of the housing.

According to another aspect of the present disclosure, a heating, ventilation, and air conditioning assembly for a vehicle roof includes a housing that defines an intake in fluid communication with a vent opening. The housing defines an interior. An O-ring is disposed around the housing and is configured to form a seal between the housing and the vehicle roof. At least one blower motor is disposed within the housing. The at least one blower motor is disposed on an opposing side of the housing relative to the intake to draw air from the intake toward the at least one blower motor. A duct extends within the interior of the housing. The duct has a first inlet and a second inlet. Each of the first inlet and the second inlet are disposed proximate to the at least one blower motor.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Additional features and advantages of the presently disclosed device will be set forth in the detailed description which follows and will be apparent to those skilled in the art from the description, or recognized by practicing the device as described in the following description, together with the claims and appended drawings.

Figure 1:
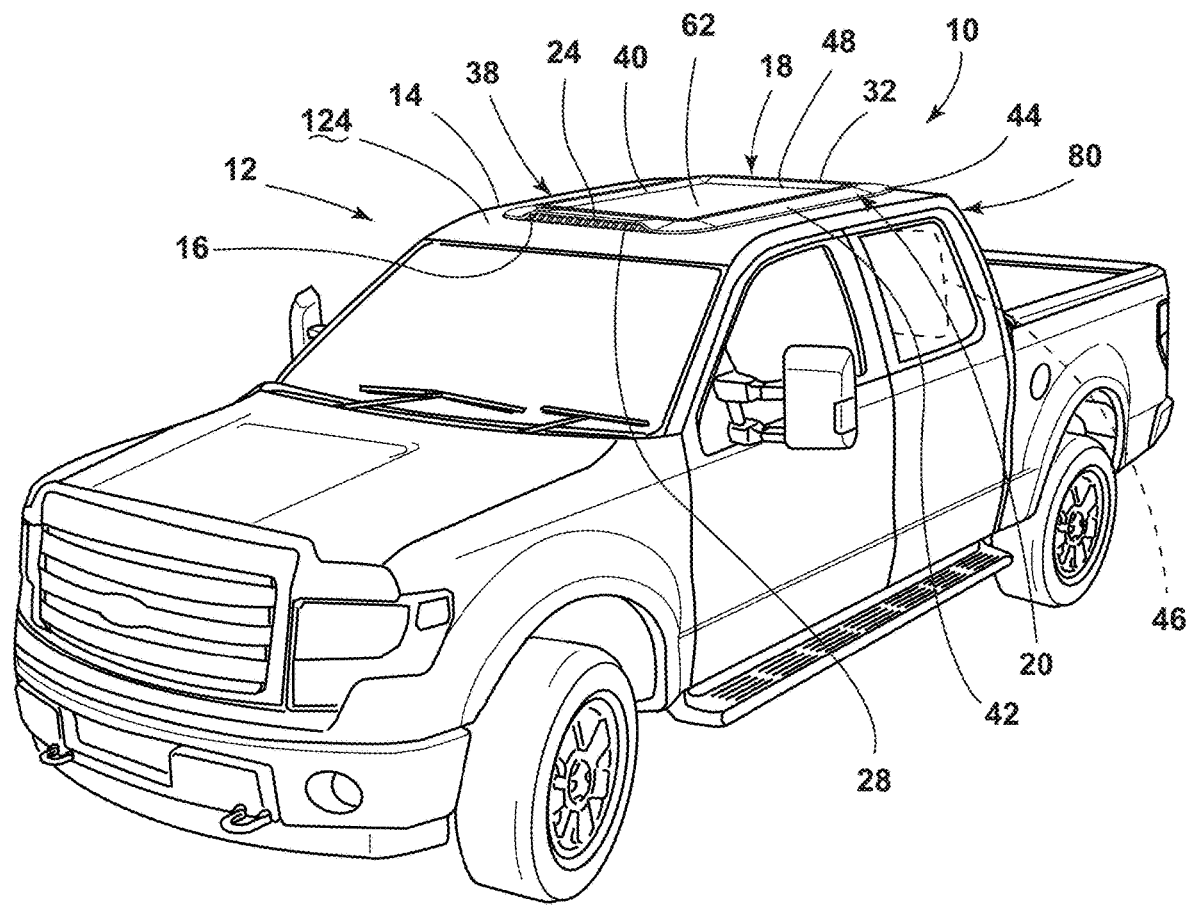
FIG. 1 is a vehicle having an HVAC assembly coupled to a roof, according to the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-14, reference numeral 10 generally designates a roof assembly for a vehicle 12 that includes a roof 14, which defines an aperture 16. A heating, ventilation, and air conditioning (HVAC) assembly 18 is selectively disposed within the aperture 16. The HVAC assembly 18 includes a housing 20 that defines an interior 22. The housing 20 also defines an intake 24 and a vent opening 26. The intake 24 is defined on a first side 28 of the housing 20. A fan 30 is disposed within the interior 22 on a second side 32 of the housing 20. The second side 32 opposes the first side 28. The duct 34 is disposed within the interior 22. The duct 34 extends between the first side 28 and the second side 32 of the housing 20. The duct 34 fluidly couples the intake 24 with the vent opening 26.

Referring to FIG. 1, the vehicle 12 includes the roof 14 defining the aperture 16 in which the HVAC assembly 18 is selectively disposed. The HVAC assembly 18 includes the housing 20, which is generally a rectangular shape. The aperture 16 is sized and shaped to receive the HVAC assembly 18 in an interference or frictional fit. The housing 20 includes a plurality of sides 38, which includes the first side 28, the second side 32, a third side 40, and a fourth side 42 to define the rectangular shape.

The housing 20 includes an outer perimeter 44 collectively defined by the sides 38. The outer perimeter 44 engages an edge of the roof 14 that defines aperture 16. The HVAC assembly 18 fills the aperture 16 to at least partially enclose an interior compartment 46 of the vehicle 12. The housing 20 of the HVAC assembly 18 also has an inner perimeter 48 collectively defined by the sides 38. The inner perimeter 48 defines a rectangular shape and generally follows the outer perimeter 44. In this way, a thickness of the interior 22 of the housing 20 is substantially similar on each side 38 of the housing 20.

The inner perimeter 48 of the housing 20 defines an opening 60, which is centrally located in the housing 20. Generally, the first side 28 of the housing 20 is a vehicle-forward side of the housing 20 and the second side 32 is a vehicle-rearward side of the housing 20. The first side 28 is spaced from the second side 32 by the opening 60. The third side 40 and the fourth side 42 are generally lateral sides that extend between the first side 28 and the second side 32. The third side 40 is spaced from the fourth side 42 by the opening 60.

Referring still to FIG. 1, a sunroof 62 is disposed within the opening 60 and is coupled to each side 38 of the housing 20 along the inner perimeter 48. The housing 20 extends around a perimeter of the sunroof 62. The sunroof 62 substantially fills the opening 60. The sunroof 62 and the housing 20 fill the aperture 16 and partially enclose the interior compartment 46.

The vehicle 12 is illustrated as a truck; however, the vehicle 12 may be a sedan, a sport-utility vehicle, a van, a crossover, other wheeled motor vehicles 12, or other styles or types of vehicles 12. The vehicle 12 may be a manually operated vehicle 12 (e.g., operated with a human driver), a fully autonomous vehicle 12 (e.g., operated without a human driver), or a partially autonomous vehicle 12 (e.g., operated with or without a human driver). Additionally, the vehicle 12 may be utilized for personal or commercial purposes, such as, for transporting, ride providing services (e.g., chauffeuring), or ride-sharing services. Further, the vehicle 12 may be an electric vehicle 12, such as a battery electric vehicle (BEV), or may have an internal combustion engine.

Figure 2:
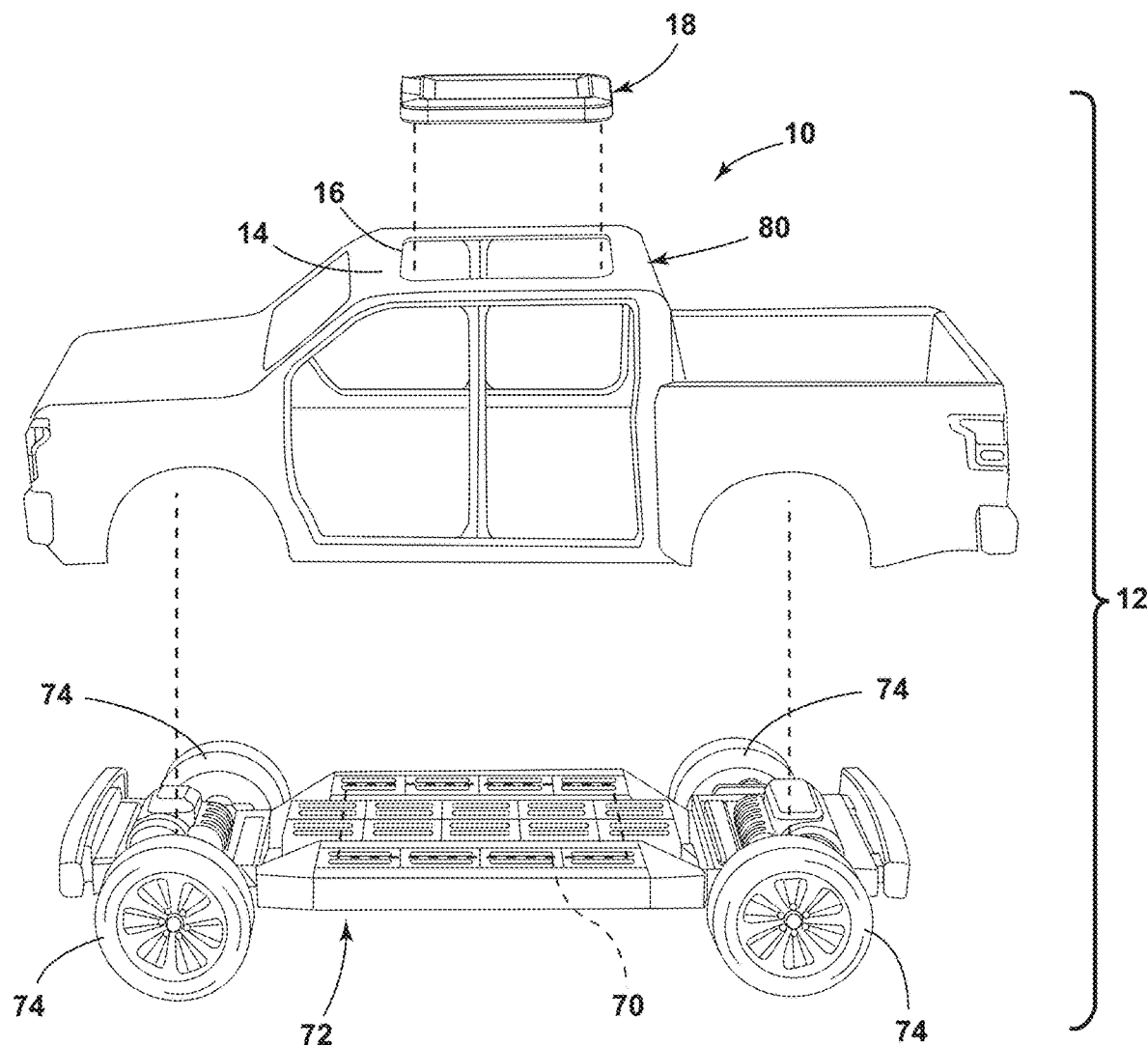
FIG. 2 is an exploded view of a vehicle including an HVAC assembly, a vehicle body, and a battery platform, according to the present disclosure.

Referring to FIG. 2, in the illustrated example, the vehicle 12 is configured as a BEV. Generally, a BEV is an electric vehicle that includes one or more rechargeable batteries 70 to power the vehicle 12. In BEV examples, the vehicle 12 includes a platform 72 that houses the battery 70. The platform 72 also provides support for components of the vehicle 12, such as wheels 74 and a body 80. The wheels 74 are generally rotatably coupled to the platform 72. In certain aspects, the platform 72 may also house drive units operably coupled to the wheels 74. The platform 72 may be utilized with various models and styles of the vehicle 12.

The vehicle 12 includes the shell or body 80 that couples to and is supported by the platform 72. The body 80, the platform 72, and the HVAC assembly 18 cooperate to substantially form the interior compartment 46 (FIG. 1) of the vehicle 12. The body 80 generally includes four sides including a front, two lateral sides, and a top, leaving a bottom of the body 80 open. When the body 80 is coupled to the platform 72, the platform 72 is positioned to close the bottom of the body 80. Further, the body 80 includes the roof 14, which defines the aperture 16 that selectively receives the HVAC assembly 18.

Figure 3A:
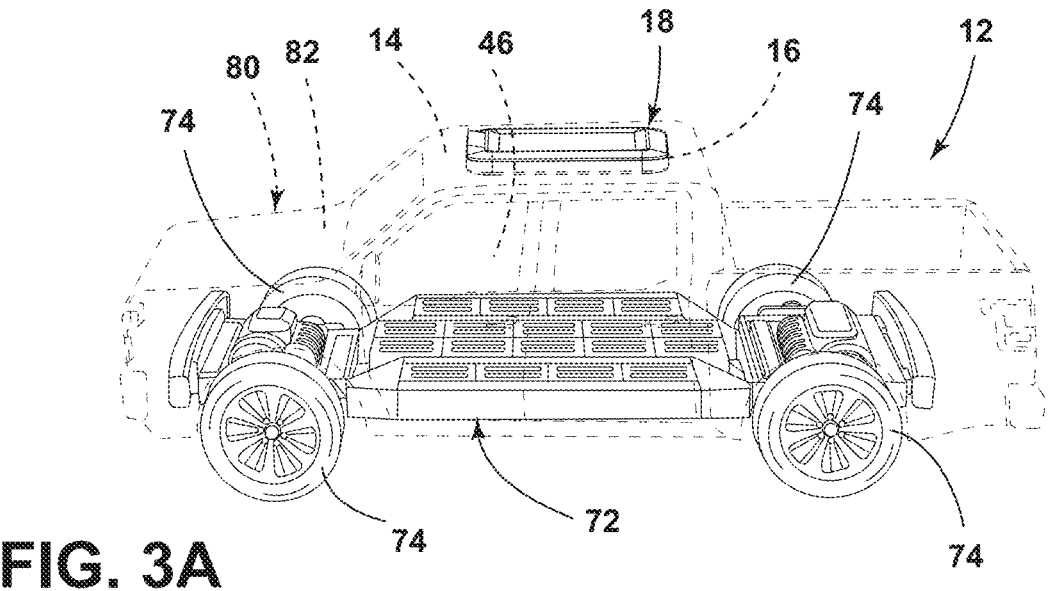
FIG. 3A is a side perspective view of a vehicle that includes an HVAC assembly, a battery platform, and a truck body, which is illustrated in phantom, according to the present disclosure.
Figure 3B:
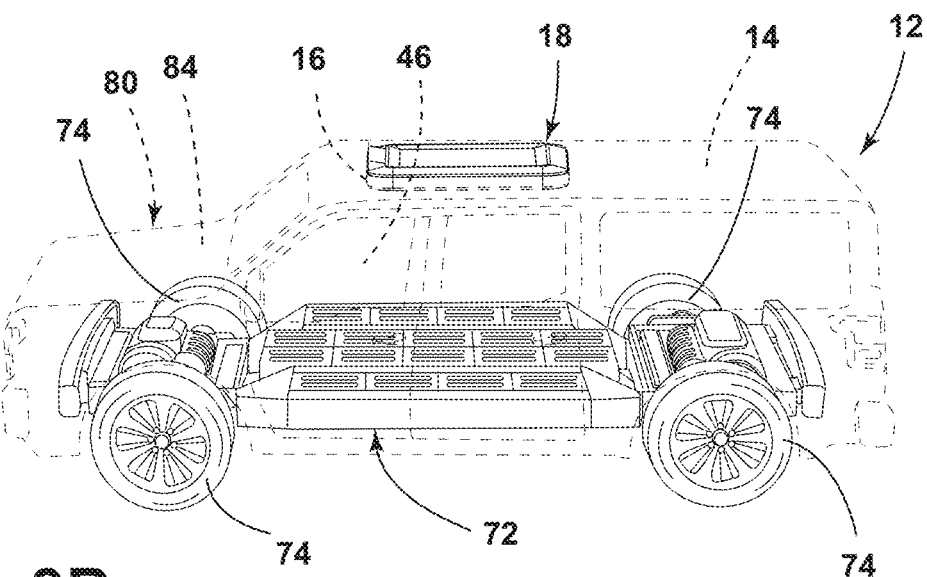
FIG. 3B is a side perspective view of a vehicle that includes an HVAC assembly, a battery platform, and a van body, which is illustrated in phantom, according to the present disclosure.

Referring to FIGS. 3A and 3B, each of the platform 72 and the HVAC assembly 18 may be utilized with different configurations of the body 80. For example, in FIG. 3A, the body 80 is configured as a truck body 82. The truck body 82 is coupled to the platform 72 and the HVAC assembly 18 is disposed within the aperture 16 defined in the roof 14 of the truck body 82. In FIG. 3B, the body 80 is configured as a van body 84. The van body 84 is disposed on the platform 72. The HVAC assembly 18 is disposed within the aperture 16 defined in the roof 14 of the van body 84. The body 80 may have a variety of configurations depending on the style or model of the vehicle 12. Many or all of the various configurations of the body 80 can be used with the platform 72 and the HVAC assembly 18 described herein. The various vehicle bodies 80 may have common attachment points on or proximate to the roof 14 to engage the HVAC assembly 18. Accordingly, the HVAC assembly 18 may be interchangeably utilized with multiple styles of vehicles 12.

Figure 4:
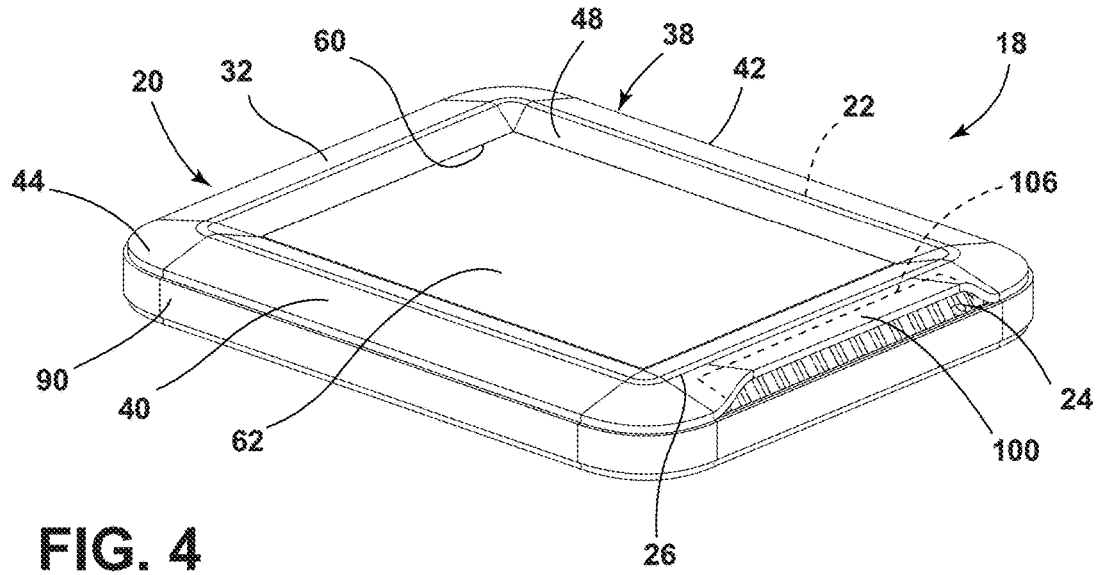
FIG. 4 is a top perspective view of an HVAC assembly for a vehicle roof, according to the present disclosure.

Referring again to FIG. 1, as well as FIG. 4, the HVAC assembly 18 is a self-contained module that can be selectively coupled with the roof 14 of the vehicle 12. As previously stated, the HVAC assembly 18 includes the housing 20 with the first side 28 opposing the second side 32 and the third side 40 opposing the fourth side 42 to define the rectangular shape. An O-ring 90, or other sealing feature, extends along the outer perimeter 44 of the housing 20. The O-ring 90 engages the edge of the roof 14 that defines the aperture 16 to provide a seal between the HVAC assembly 18 and the body 80. The O-ring 90 may be advantageous for preventing water or debris from entering the interior compartment 46 of the vehicle 12 through the aperture 16.

The first side 28, generally the vehicle-forward side, of the HVAC assembly 18 defines the intake 24. The intake 24 allows air from an area external to the vehicle 12 to be introduced into the interior 22 of the housing 20. It is contemplated that introduction of the air through the intake 24 may be passive, or alternatively a fan may be disposed proximate to the intake 24 to actively draw air through the intake 24. The intake 24 allows air to enter the HVAC assembly 18, be treated or processed, and be expelled into the interior compartment 46 (FIG. 1).

Figure 5A:
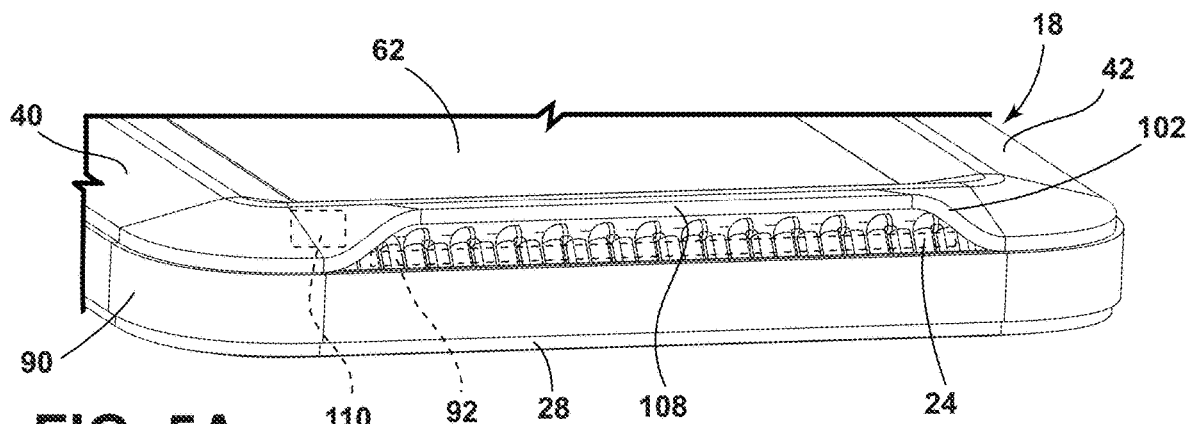
FIG. 5A is a partial side perspective view of an HVAC assembly with a cover for an intake in an opened position, according to the present disclosure.
Figure 5B:
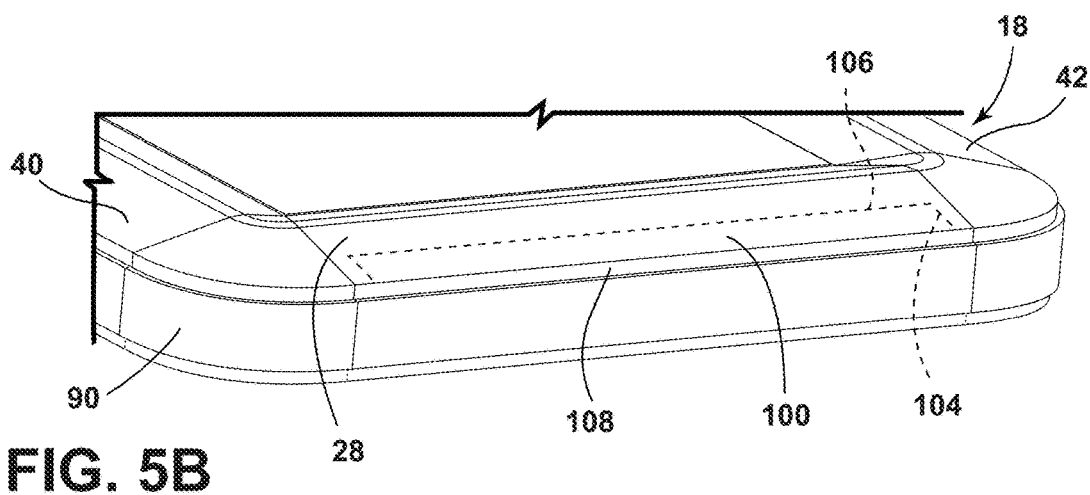
FIG. 5B is a partial side perspective view of an HVAC assembly with a cover for an intake in a closed position, according to the present disclosure.

Referring still to FIG. 4, as well as to FIGS. 5A and 5B, a filter 92 may be disposed proximate to the intake 24. The filter 92 may be disposed within the housing 20 and may extend across a substantial portion, or all, of the intake 24. The filter 92 may be advantageous to prevent environmental aspects, such as water or debris, from entering the HVAC assembly 18 through the intake 24.

In various aspects, the housing 20 includes a cover 100 arranged on the first side 28 of the housing 20 proximate to the intake 24. The cover 100 is generally operable between an opened position 102, as illustrated in FIG. 5A, and a closed position 104, as illustrated in FIG. 5B. The operation of the cover 100 selectively allows air to enter the housing 20 through the intake 24. The cover 100 is generally independently movable relative to the remainder of the housing 20. The cover 100 may be coupled to the remainder of the housing 20 via a hinge 106, allowing for the independent operation of the cover 100. The hinge 106 may be a hinge assembly or a living hinge. The living hinge may be advantageous for a more seamless appearance between the cover 100 and the remainder of the housing 20. When in the closed position 104, an edge 108 of the cover 100 abuts the O-ring 90. The engagement between the edge 108 and the O-ring 90 seals the intake 24, thereby preventing air from entering into the HVAC assembly 18.

The cover 100 is operably coupled to a cover actuator 110, which is generally disposed within the housing 20. The cover actuator 110 is configured to operate the cover 100 between the opened position 102 and the closed position 104. The cover actuator 110 may be a rack-and-pinion gear assembly, a rotatable gear assembly, a telescoping actuator, a linear actuator, or another practicable assembly for moving the cover 100 about the hinge 106. The cover 100 may be an integrally formed component of the housing 20, or alternatively may be a separate component coupled to the remainder of the housing 20 by the hinge 106. It is also contemplated that the housing 20 may be constructed to define the intake 24 that does not close, such that the cover 100 remains in the opened position 102.

Figure 6:
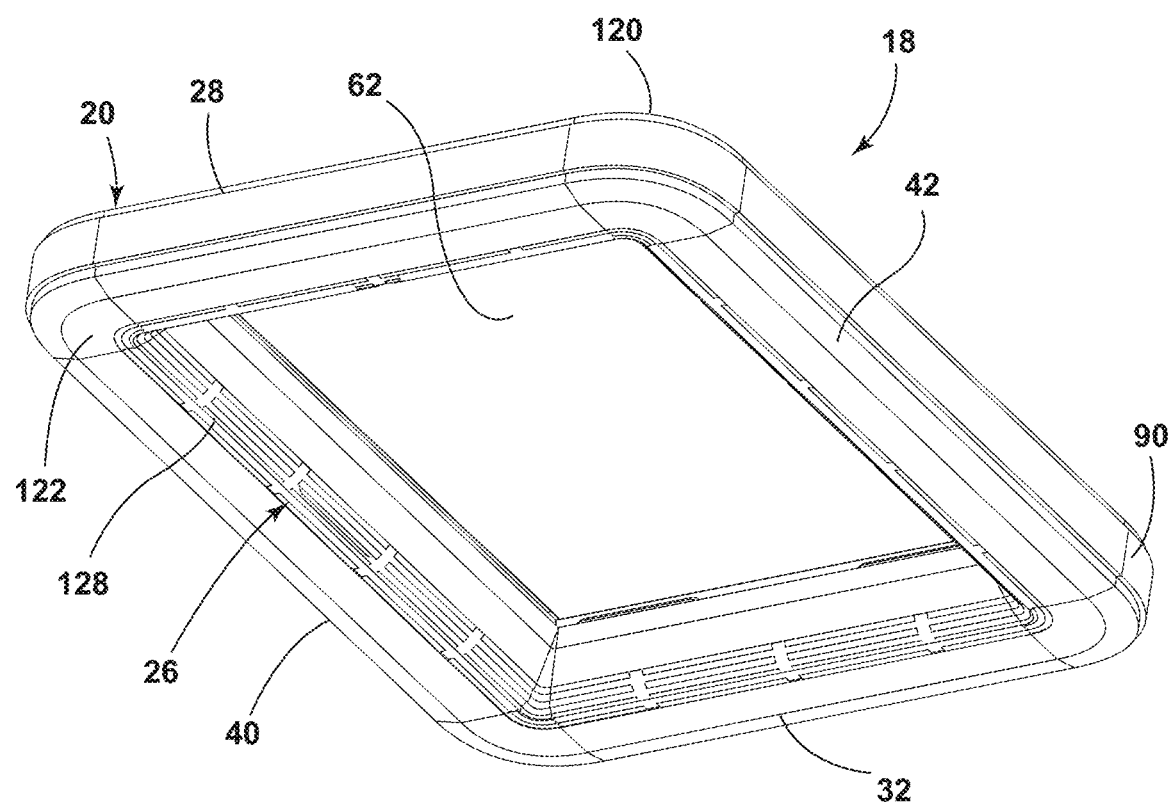
FIG. 6 is a bottom perspective view of an HVAC assembly for a vehicle roof, according to the present disclosure.

Referring again to FIG. 4, as well as to FIG. 6, the housing 20 includes an exterior bezel 120 and an interior bezel 122. The exterior bezel 120 is disposed adjacent to an outer surface 124 (FIG. 1) of the roof 14. The cover 100 may be integrally formed with or otherwise coupled to the exterior bezel 120. The interior bezel 122 is disposed proximate to a headliner 126 (FIG. 12) within the interior compartment 46 of the vehicle 12. The exterior bezel 120 and the interior bezel 122 are coupled to one another to define and enclose the interior 22 of the housing 20. Generally, the exterior bezel 120 forms an upper portion of the housing 20 and the interior bezel 122 forms a lower portion of the housing 20. Additionally or alternatively, the exterior bezel 120 is exposed to an area external to the vehicle 12, while the interior bezel 122 is disposed within the interior compartment 46 (FIG. 1) of the vehicle 12.

The interior bezel 122 generally includes a grate 128, which extends along the inner perimeter 48 of each side 38 of the housing 20. The grate 128 appears as a continuous band-like feature that extends along the inner perimeter 48 and around the opening 60. The grate 128 defines the vent opening 26, allowing air to be expelled from the interior 22 of the housing 20.

The intake 24 is defined in the exterior bezel 120 on an exterior side of the sunroof 62. The vent opening 26 is defined on the interior bezel 122 on an interior side of the sunroof 62. Accordingly, air that is in the area external to the vehicle 12 travels through the intake 24, through the interior 22 of the housing 20, and is expelled on the opposing side of the sunroof 62 through the vent opening 26 into the interior compartment 46. Due to the vent opening 26 being defined on each side 38 of the housing 20, air is expelled in a 360° airflow pattern around the opening 60 of the housing 20.

Figure 7:
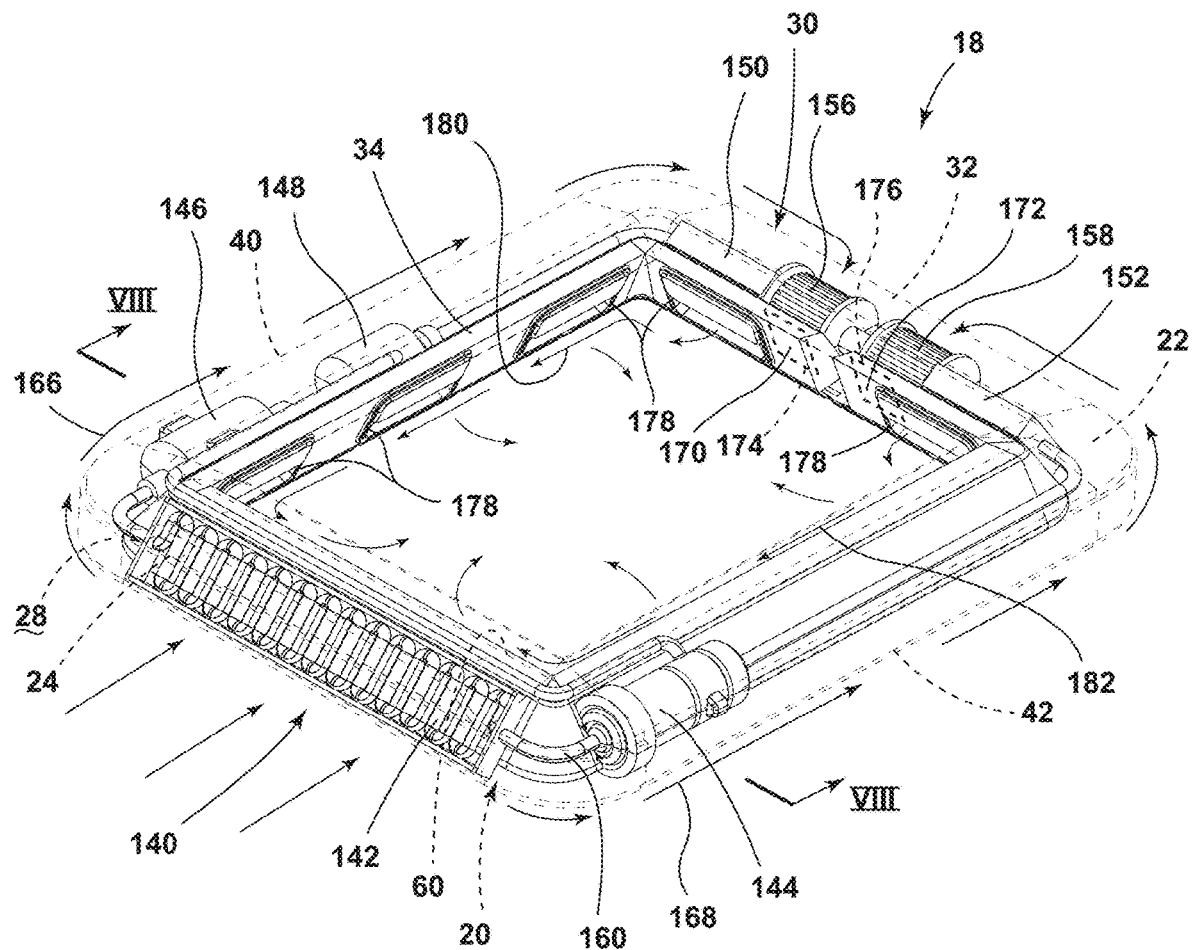
FIG. 7 is a top perspective view of an HVAC system within an HVAC assembly, where a housing of the HVAC assembly is illustrated in phantom, according to the present disclosure.

Referring to FIG. 7, the HVAC assembly 18 houses an HVAC system 140 for treating air that enters the housing 20 through the intake 24. The HVAC system 140 generally includes a condenser 142, a compressor 144, a drier 146, an expansion valve 148, and evaporators 150, 152, which are each disposed within the interior 22 of the housing 20. In this way, the HVAC system 140 is selectively coupled to the roof 14 of the vehicle 12 (FIG. 1). This positioning of HVAC system 140 optimizes space for additional or alternative uses in a vehicle-forward portion of the vehicle 12 where conventional HVACs are located. The HVAC system 140 may also include condenser fans 154 disposed proximate to the condenser 142 to cool the condenser 142. Additionally, the HVAC system 140 includes the fan 30, which generally includes two blower motors 156, 158. The blower motors 156, 158 are disposed proximate to the evaporators 150, 152 to drive airflow through the HVAC assembly 18.

Generally, the HVAC system 140 cleans, cools, heats, regulates, ventilates, and/or dehumidifies air directed into the vehicle 12. Air enters through the intake 24, is processed by the HVAC system 140, and is expelled into the interior compartment 46. Tubing 160 and wiring 162 (FIG. 9) extends between various components of the HVAC system 140. The tubing 160 allows a refrigerant to be transferred through the HVAC system 140, while the wiring 162 provides power to the HVAC system 140.

The compressor 144 is disposed on the fourth side 42 of the housing 20 proximate to the condenser 142. The compressor 144 generally compresses the refrigerant into a heated vapor, thereby putting the HVAC system 140 into a high-pressure state. The pressure forces the refrigerant out of the compressor 144 through the tubing 160 throughout the HVAC system 140.

The refrigerant travels from the compressor 144 to the condenser 142, where the refrigerant is cooled by the air passing over the condenser 142. Generally, the refrigerant changes to a liquid as the refrigerant travels through the condenser 142. The condenser 142 is disposed in the first side 28 of the housing 20 proximate to the intake 24.

The refrigerant then moves to the drier 146. The drier 146 is disposed on the third side 40 of the housing 20 proximate to the compressor 144. In this way, the drier 146 is on an opposing side of the housing 20 relative to the compressor 144. The drier 146 operates to remove moisture from within the HVAC system 140. Further, the drier 146 may include a filter that can trap contaminants that may be inside the HVAC system 140.

The expansion valve 148 is disposed proximate to the drier 146 in the third side 40 of the housing 20. The cooled refrigerant moves through the expansion valve 148, which creates a pressure drop. Generally, the expansion valve 148 operates to turn the refrigerant into a gaseous form or a mist.

The two evaporators 150, 152 are disposed on the second side 32 of the housing 20, which is an opposing side of the housing 20 relative to the condenser 142. The refrigerant travels through the evaporators 150, 152 in the gaseous or mist state to absorb heat from air that is moving through the evaporators 150, 152. The refrigerant then returns to the compressor 144 to again be compressed.

As previously stated, the condenser 142 is disposed proximate to the intake 24. Air travels through the intake 24 and passes over the condenser 142, removing heat from the condenser 142. The air then travels through the interior 22 of the housing 20 to the second side 32 of the housing 20. The airflow divides into two paths 166, 168 within the housing 20. One airflow path 166 extends from the first side 28, along the third side 40, and to the second side 32. The second airflow path 168 extends from the first side 28, along the fourth side 42, and to the second side 32. Accordingly, the two airflow paths 166, 168 generally form a circular pattern through the housing 20 around the sunroof 62.

The blower motors 156, 158 are disposed on the second side 32 of the housing 20. The blower motors 156, 158 operate to draw the air from the first side 28 of the housing 20 to the second side 32. Additionally or alternatively, the blower motors 156, 158 push the air across the cooled tubes of the evaporators 150, 152 to deliver cooled air into the duct 34. Accordingly, air travels through the intake 24 through the housing 20 and into the duct 34.

Figure 8:
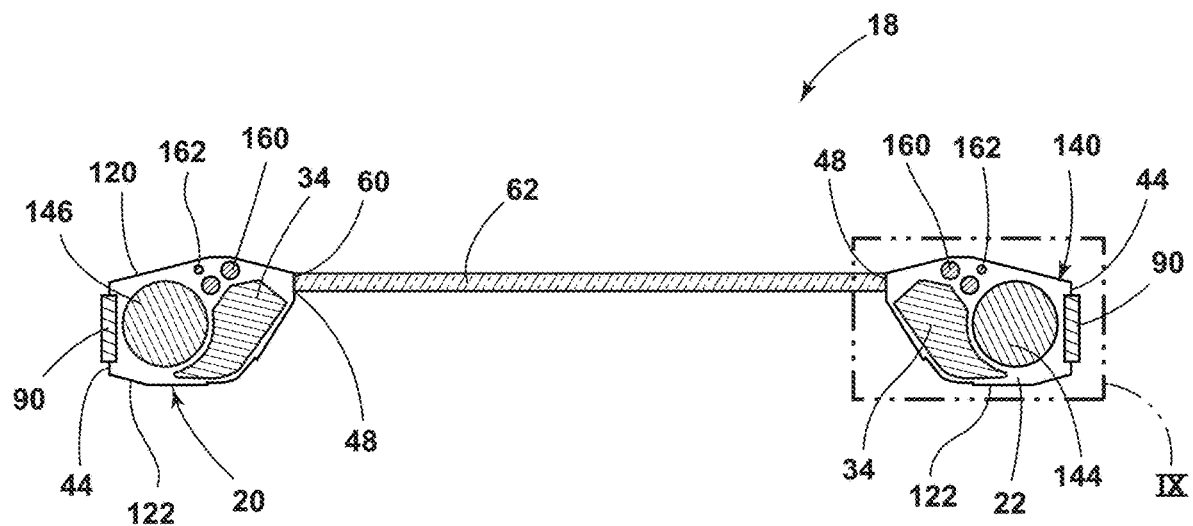
FIG. 8 is a cross-sectional view of the HVAC assembly of FIG. 7, taken along lines VIII-VIII.
Figure 9:
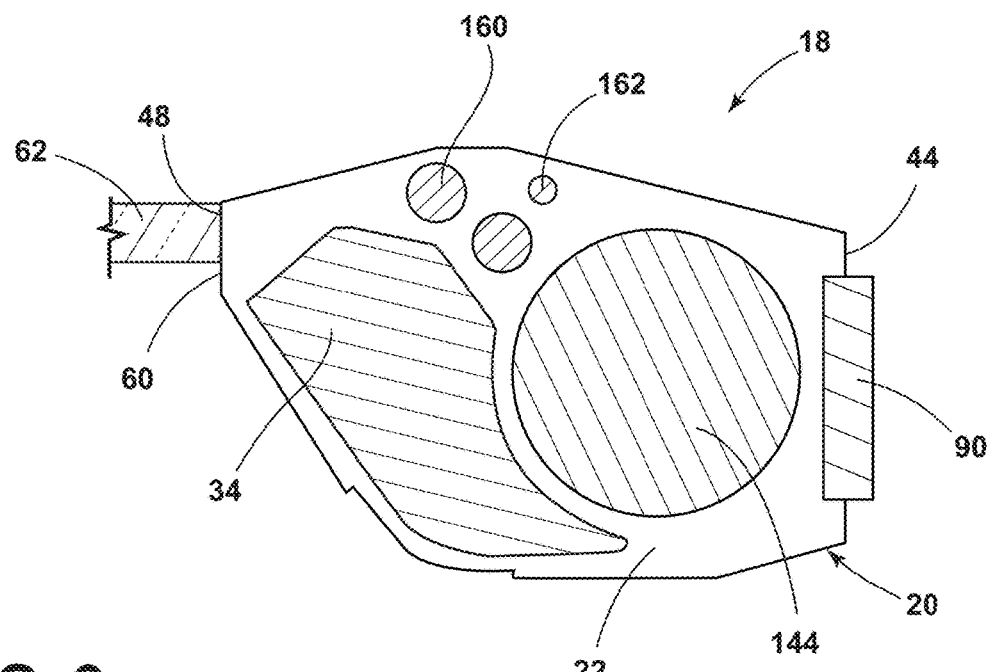
FIG. 9 is an enlarged view of a side of the HVAC assembly of FIG. 8, taken at area IX.

Referring still to FIG. 7, as well as FIGS. 8 and 9, the duct is generally C-shaped. The duct 34 includes two ends 170, 172, which are disposed adjacent to one another on the second side 32 of the housing 20. The first end 170 is spaced from the second end 172 such that the duct 34 does not extend 360° through the housing 20. Each end 170, 172 defines an inlet 174, 176, respectively. The first blower motor 156 is disposed adjacent to the first inlet 174 and the second blower motor 158 is disposed adjacent to the second inlet 176 to direct air into the duct 34 at two locations.

The duct 34 extends from the first end 170 on the second side 32 of the housing 20, along the third side 40, along the first side 28, along the fourth side 42, and again along the second side 32 to the second end 172. Accordingly, the duct 34 extends substantially around the opening 60 defined by the inner perimeter 48 of the housing 20. The air travels through the first and second inlets 174, 176 and travels in two paths 180, 182 along the length thereof. The first path 180 is defined from the first inlet 174, partially along the second side 32, along the third side 40, and partially along the first side 28. The second path 182 is defined from the second inlet 176, partially along the second side 32, along the fourth side 42, and partially along the first side 28. The airflow paths 180, 182 generally form an inner circular configuration. In this way, air travels in an outer circular configuration through the housing 20 from the first side 28 to the second side 32, and then an inner circular configuration through the duct 34 from the second side 32 to the first side 28.

The duct 34 defines multiple outlets 178 in a spaced apart arrangement along a length of the duct 34. In the illustrated example, two outlets 178 are defined on each of the first side 28 and the second side 32 of the housing 20, and three outlets 178 are defined on each of the third and fourth sides 40, 42 of the housing 20. The outlets 178 allow air to leave the duct 34 and enter the interior compartment 46 of the vehicle 12.

As air travels along the length of the duct 34, away from the inlets 174, 176, some air is expelled at each outlet 178 along the airflow path 180, 182, respectively, while some air continues to travel through the duct 34 toward the first side 28. Air is expelled from each outlet 178, toward the opening 60 defined by the inner perimeter 48. The air remaining in the duct 34 on the first side 28 of the housing 20 may be forced through the outlets 178 on the first side 28 of the housing 20 by the opposing airflow path 180, 182. Generally, the outlets 178 are arranged to open toward the inner perimeter 48.

Referring still to FIGS. 8 and 9, the HVAC system 140 and the duct 34 are disposed within, and contained by, the housing 20. The HVAC system 140 and the duct 34 extend around the opening 60 and, consequently, around the sunroof 62. In this way, the components of the HVAC system 140 and the duct 34 are generally arranged in a square around the sunroof 62. The duct 34 is arranged substantially below the sunroof 62, which allows the outlets 178 to be arranged on an interior side of the sunroof 62.

Figure 10:
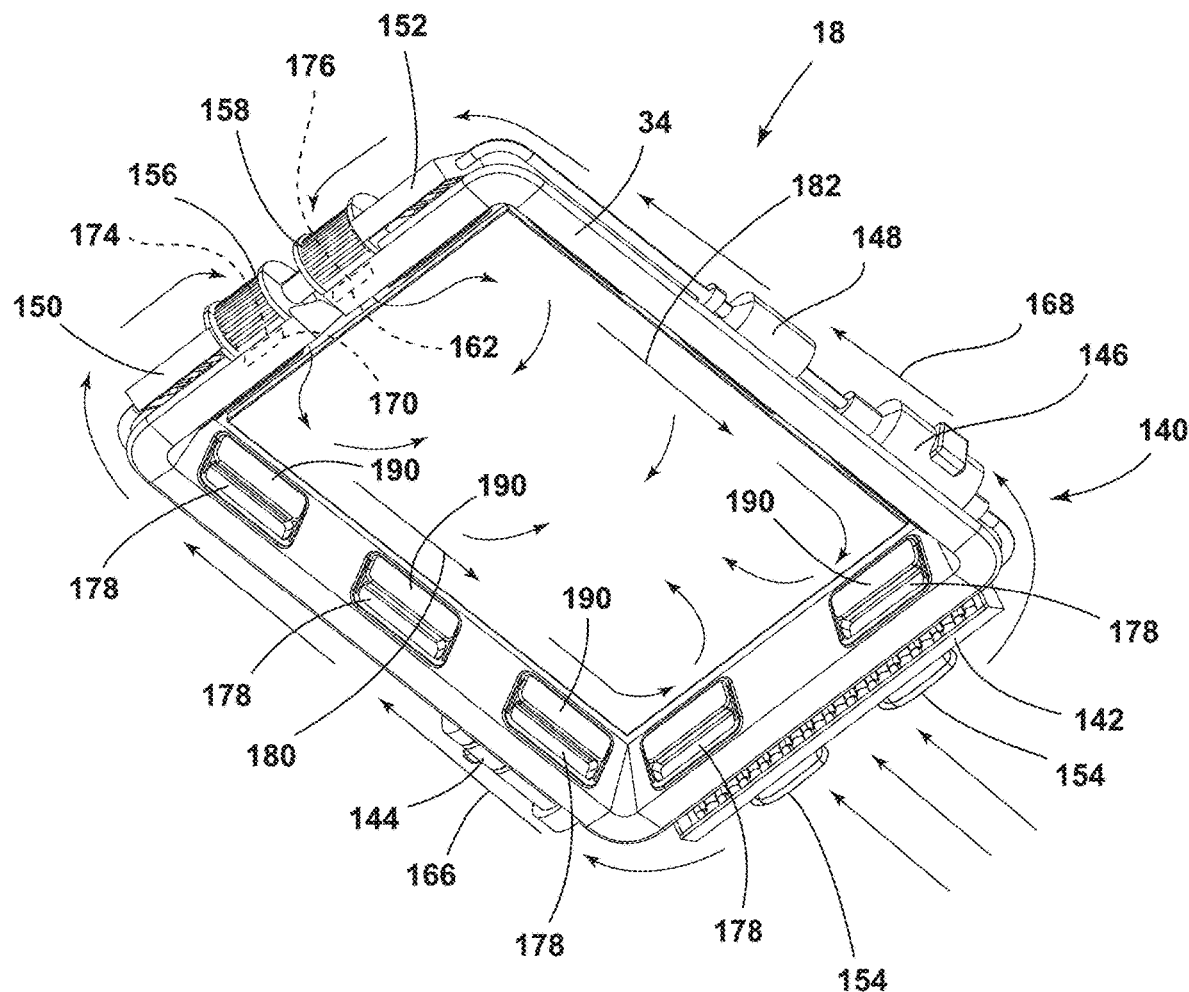
FIG. 10 is a bottom perspective view of an HVAC assembly that has a duct with outlets, where a housing has been removed, according to the present disclosure.
Figure 11A:
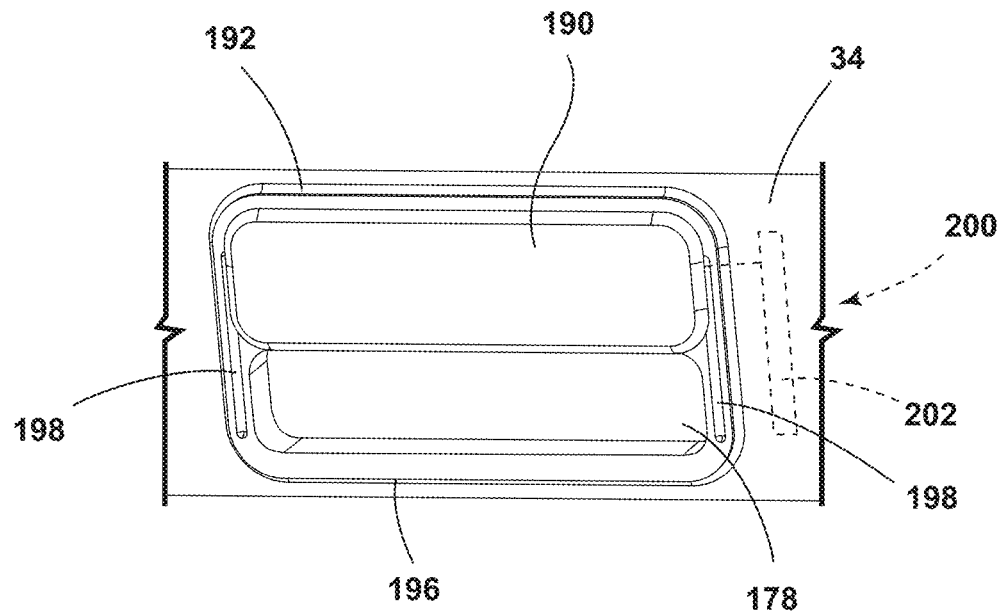
FIG. 11A is a front perspective view of a shutter operably coupled to a duct of an HVAC assembly, with the shutter in an opened position relative to a duct outlet, according to the present disclosure.
Figure 11B:
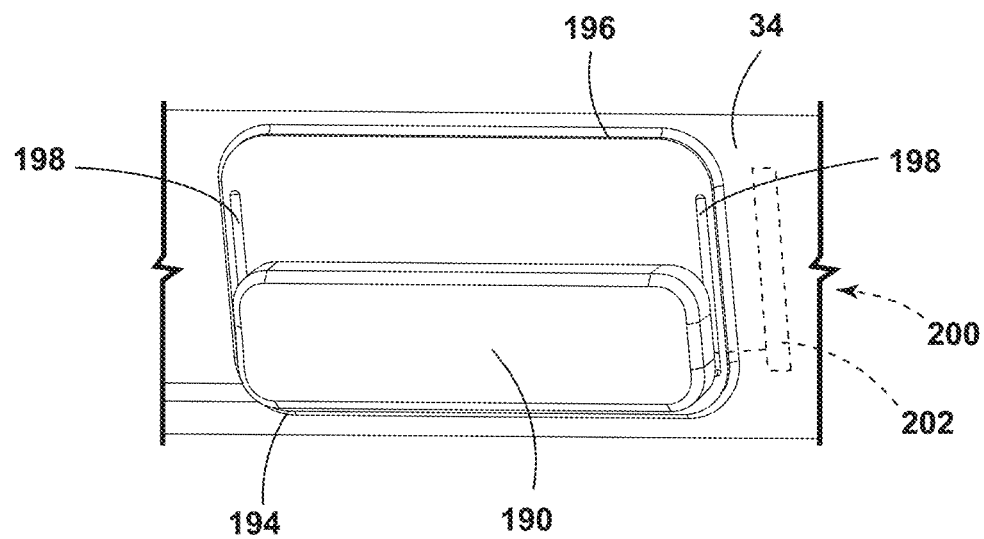
FIG. 11B is a front perspective view of a shutter operably coupled to a duct of an HVAC assembly, with the shutter in a closed position relative to a duct outlet, according to the present disclosure.

Referring to FIGS. 10-11B, shutters 190 are operably coupled with the duct 34. The shutters 190 are independently operable between an opened position 192, as illustrated in FIG. 11A, and a closed position 194, as illustrated in FIG. 11B, relative to the respective outlets 178. Each single shutter 190 is generally associated with a single outlet 178. The shutters 190 are independently operable to selectively open and close the outlets 178. The shutters 190 allow for the airflow into the interior compartment 46 to be controlled in a dynamic and flexible way.

The duct 34 generally defines a recessed region 196 around each outlet 178. The shutter 190 is movable within the recessed region 196. In the illustrated example, the duct 34 defines elongated apertures 198 on each side of each shutter 190. The elongated apertures 198 define the movement path of the shutters 190. Accordingly, the elongated apertures 198 are positioned and sized to allow the shutters 190 to be fully disposed over and fully removed from the outlets 178.

Through the elongated apertures 198, the shutters 190 generally engage a shutter actuation assembly 200. The shutter actuation assembly 200 includes multiple shutter actuators 202, with each shutter actuator 202 being associated with a single shutter 190. The shutter actuators 202 may be a rail assembly, a rack and pinion gear assembly, a rotatable gear assembly, or other motorized actuator to adjust the shutters 190 between the opened positions 192 and the closed positions 194. The shutter actuators 202, when activated, may automatically adjust the position of the shutters 190. Generally, the shutters 190 translate vertically between opened and closed positions 192, 194; however, the shutters 190 may slidably engage the duct 34 variety of directions relative to the outlets 178.

Figure 12:
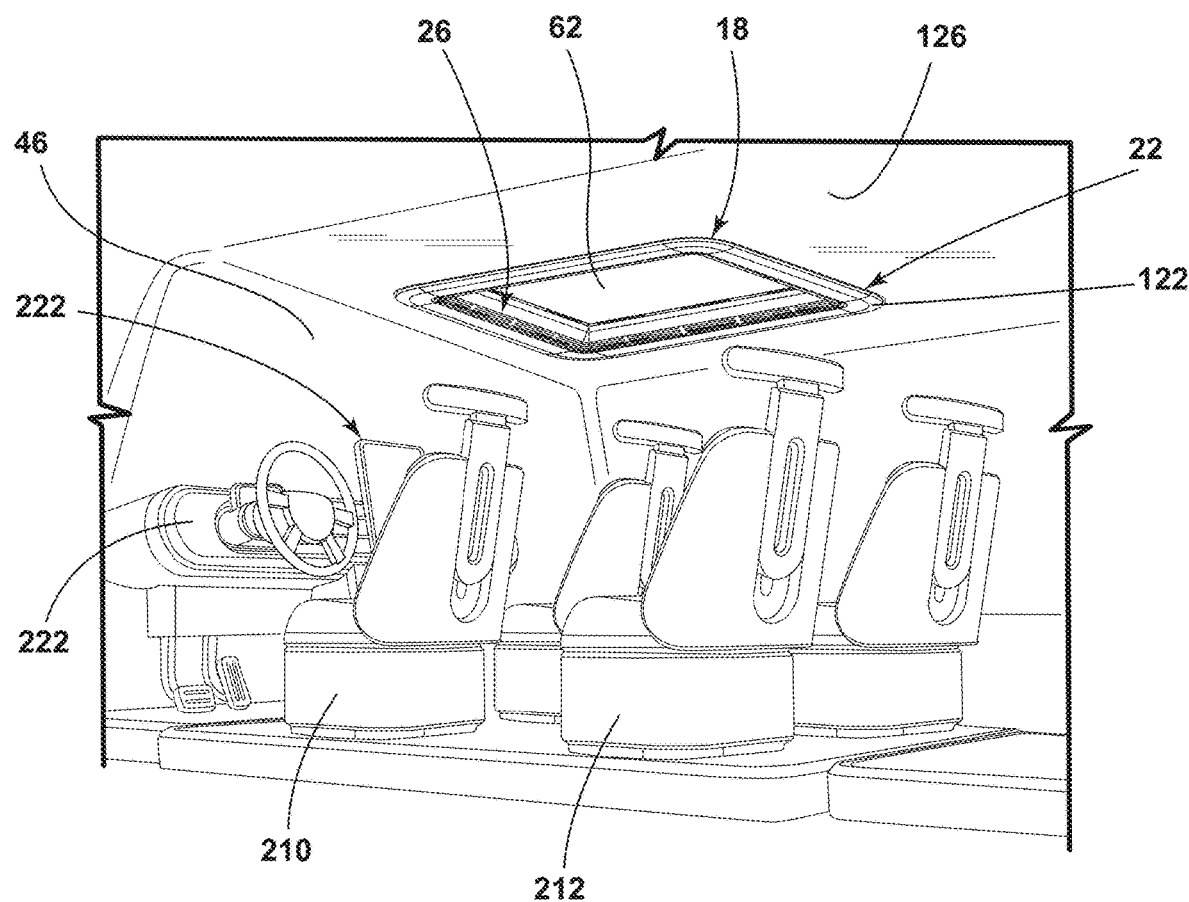
FIG. 12 is a partial side perspective view of an interior compartment of a vehicle having an HVAC assembly coupled to a roof, according to the present disclosure.

Referring still to FIG. 10, as well as FIG. 12, the HVAC assembly 18 is visible within the interior compartment 46 of the vehicle 12. Generally, the HVAC assembly 18 extends over a first seating row 210 and a second seating row 212. If additional seating rows are disposed within the interior compartment 46 of the vehicle 12, the HVAC assembly 18 may extend over the additional seating rows as well. The interior bezel 122 and the grate 128 are visible proximate to the headliner 126 from within the interior compartment 46. The interior bezel 122 with the grate 128 generally obscures the duct 34 and the shutters 190 from the view of passengers or occupants within the interior compartment 46. In this way, the passengers may not be able to view which shutters 190 are in opened or closed positions 192, 194 by viewing the HVAC assembly 18.

The air is expelled through the outlets 178 around the perimeter of the opening 60, through the vent opening 26, and into the interior compartment 46. Accordingly, the air flowing into the interior compartment 46 has a substantially 360° airflow pattern around the HVAC assembly 18. Additionally or alternatively, the grate 128 may operate to diffuse the air being expelled from the outlets 178 to further contribute to this 360° airflow pattern. As the HVAC assembly 18 is disposed over both the first seating row 210 and the second seating row 212, the 360° airflow pattern provides a similar airflow experience to passengers within each seating row 210, 212 by more evenly distributing air being expelled the HVAC assembly 18.

Figure 13:
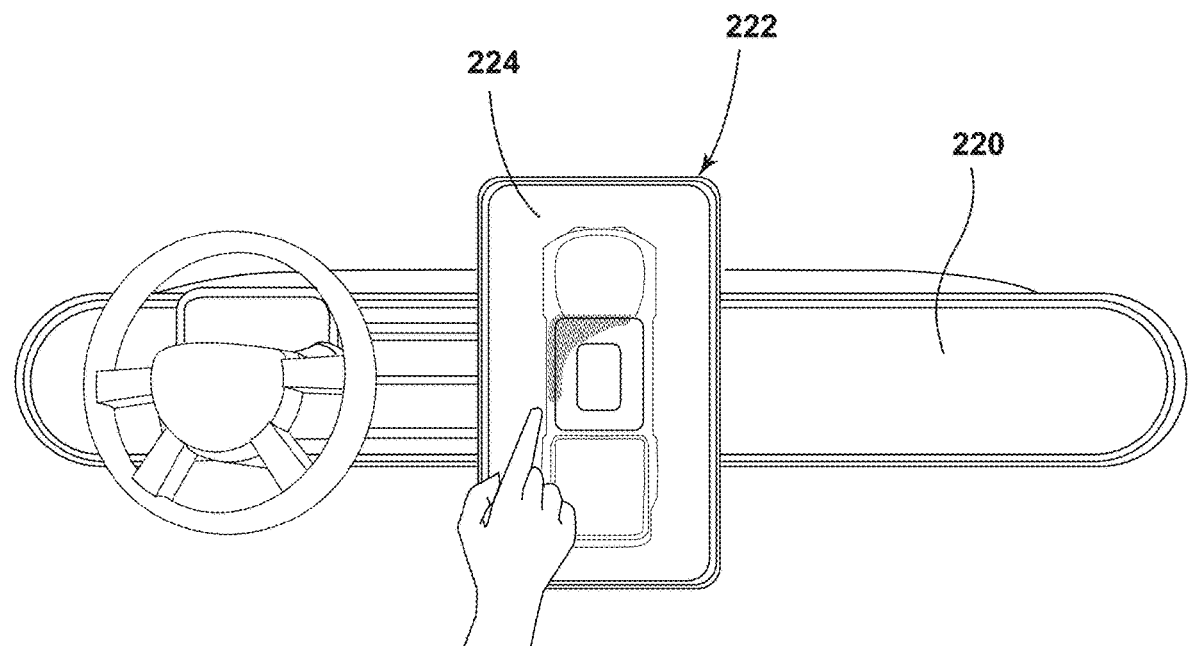
FIG. 13 is a schematic view of a user interface coupled to a vehicle dashboard and having a touch screen for receiving an input for controlling an HVAC assembly, according to the present disclosure.
Figure 14:
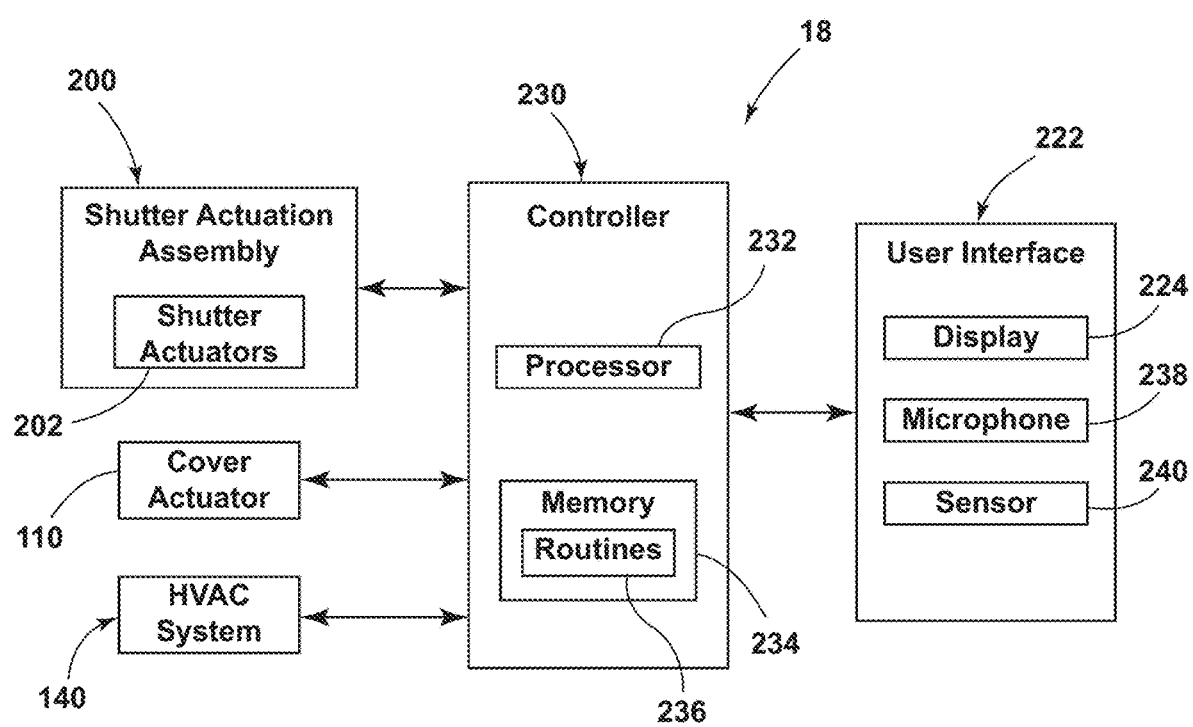
FIG. 14 is a block diagram of an HVAC assembly, according to the present disclosure.

Referring still to FIG. 12, as well as FIGS. 13 and 14, the vehicle 12 may include a dashboard 220 disposed in the interior compartment 46. A user interface 222 may be coupled to the dashboard 220. The user interface 222 may receive inputs relating to the control of the HVAC assembly 18. The user interface 222 may be utilized to operate the cover actuator 110, the HVAC system 140, the shutter actuation assembly 200, or a combination thereof. In the illustrated example of FIG. 13, the user interface 222 includes a display 224 that receives a touch input from a passenger or occupant of the vehicle 12. The display 224 includes a graphical illustration of the vehicle 12 where the passenger may select certain outlets 178 to be opened, thereby creating different zones within the interior compartment 46. As illustrated, the vehicle-forward and the vehicle-left side outlets 178 are selected to be in the opened position 192, while the outlets 178 on the vehicle-right side and the vehicle-rearward side of the HVAC assembly 18 are to remain in the closed position 194.

The user interface 222 is communicatively coupled to a controller 230 of the HVAC assembly 18. The controller 230 has a processor 232, a memory 234, and other control circuitry. Instructions or routines 236 are stored within the memory 234 and executable by the processor 232. The controller 230 may be in communication with an overall control unit of the vehicle 12. The controller 230 is in communication with at least the HVAC system 140, the cover actuator 110, and the shutter actuation assembly 200 of the HVAC assembly 18. The input provided to the user interface 222 is communicated to the controller 230, which then activates, deactivates, or adjusts the corresponding component of the HVAC assembly 18 in response to the input.

The user interface 222 can receive the input via the display 224, a microphone 238, a sensor 240, or combination thereof. When using the microphone 238, the user interface 222 may receive a voice command. When utilizing the sensor 240, the user interface 222 may sense a gesture proximate to the user interface 222. The sensor 240 may be a gesture sensor, proximity sensor, capacitive sensor, or another practicable sensor to receive the input from the user.

Referring to FIGS. 1-14, the HVAC assembly 18 is a self-contained module that can be selectively coupled to the roof 14 of the vehicle 12. The HVAC assembly 18 may be utilized with a variety of vehicle body 80 configurations. THE HVAC assembly 18 houses the HVAC system 140 for providing treated air to the interior compartment 46 from proximate to the headliner 126. The cover 100 is adjusted to the opened position 102 via the cover actuator 110 to allow air to enter the housing 20. The air travels over the condenser 142 and through the interior 22 of the housing 20 around the sunroof 62. The air is pushed over the evaporators 150, 152 by the blower motors 156, 158 and into the duct 34. The air travels through the duct 34 and is expelled through the outlets 178 where the associated shutters 190 are in the opened position 192. The air travels through the vent opening 26 of the housing 20 and into the interior compartment 46. With all the shutters 190 in the opened positions 192, the air is expelled into the interior compartment 46 in a 360° airflow pattern, providing a similar airflow to passengers in the first seating row 210 and the second seating row 212.

Use of the present device may provide for a variety of advantages. For example, the HVAC system 140 is disposed within the HVAC assembly 18 coupled to the roof 14, thereby providing additional space within the interior compartment 46. Additionally, the housing 20 extends around a sunroof 62, creating the self-contained roof module. Also, the self-contained HVAC assembly 18 may be selectively coupled with various styles or configurations of vehicle 12. Further, the shutters 190 may be independently operated to open and close selected outlets 178 to provide a dynamic and personalized airflow pattern within the vehicle 12. Moreover, the HVAC assembly 18 extends over each of the first and second seating rows 210, 212 within the interior compartment 46, providing a similar airflow experienced to passengers in each seating row 210, 212. Additionally, the configuration and positioning of the HVAC assembly 18 may improve the experience the passenger has within the vehicle 12. Moreover, in BEV examples, the positioning of the HVAC assembly 18 provides space for more dynamic interiors where the HVAC system 140 is not utilized for cooling an internal combustion engine. Additional benefits and/or advantages may be realized and/or achieved.

According to various examples, a vehicle roof assembly includes a roof that defines an aperture. A heating, ventilation, and air conditioning assembly is selectively disposed within the aperture. The heating, ventilation, and air conditioning assembly includes a housing defining an interior. The housing defines an intake and a vent opening. The intake is defined on a first side of the housing. A fan is disposed within the interior on a second side of the housing. The second side opposes the first side. A duct is disposed within the interior. The duct extends between the first side and the second side of the housing. The duct fluidly couples the intake with the vent opening. Embodiments of the present disclosure may include one or a combination of the following features:

- the heating, ventilation, and air conditioning assembly includes a condenser, a compressor, a drier, an expansion valve, and an evaporator, and wherein each of the condenser, the compressor, the drier, the expansion valve, and the evaporator is disposed within the interior of the housing;
- the housing has an inner perimeter that defines a central opening;
- the vent opening extends along the inner perimeter of the housing around the central opening to direct air from the duct toward the central opening;
- a sunroof coupled to the inner perimeter of the housing and disposed within the central opening, wherein the housing extends around the sunroof;
- the heating, ventilation, and air conditioning assembly includes a shutter slidably engaged with the duct to open and close an outlet of the duct; and
- the housing includes an exterior bezel and an interior bezel, wherein the exterior bezel defines the intake and the interior bezel defines the vent opening.

According to various examples, a heating, ventilation, and air conditioning unit for a vehicle roof includes a housing having an inner perimeter that defines a central opening. The housing defines an intake and a vent opening. A sunroof is disposed within the central opening. The vent opening is defined by the inner perimeter of the housing proximate to the sunroof. A fan is disposed within the housing and is configured to draw air from the intake through an interior of the housing. A duct extends through the interior of the housing and around the sunroof. The duct defines an outlet in fluid communication with the vent opening of the housing. Embodiments of the present disclosure may include one or a combination of the following features:

- the intake is defined on a first side of the sunroof and the vent opening is defined on a second side of the sunroof;
- a shutter operably coupled to the duct, wherein the shutter is configured to slidably engage the duct to open and close the outlet;
- an actuator operably coupled to the shutter to adjust a position of the shutter relative to the outlet, a controller communicatively coupled to the actuator; and a user interface communicatively coupled to the controller, wherein the controller adjusts the position of the shutter via the actuator in response to an input received by the user interface;
- the housing includes a cover, wherein the cover is operable between a first position and a second position to open and close the intake;
- an O-ring extending along an outer perimeter of the housing and configured to form a seal between the housing and the vehicle roof;
- a condenser disposed within the housing proximate to the intake and an evaporator disposed within the housing proximate to the fan, wherein the condenser is disposed on an opposing side of the sunroof relative to the evaporator; and
- the housing includes a grate that extends along the inner perimeter thereof, and wherein the grate defines the vent opening.

According to various examples, a heating, ventilation, and air conditioning assembly for a vehicle roof includes a housing which defines an intake in fluid communication with a vent opening. The housing defines an interior. An O-ring is disposed around the housing and configured to form a seal between the housing and the vehicle roof. At least one blower motor is disposed within the housing. The at least one blower motor is disposed on an opposing side of the housing relative to the intake to draw air from the intake toward the at least one blower motor. A duct extends within the interior of the housing. The duct has a first inlet and a second inlet. Each of the first inlet and the second inlet are disposed proximate to the at least one blower motor. Embodiments of the present disclosure may include one or a combination of the following features:

- the at least one blower motor includes a first blower motor disposed proximate to the first inlet and a second blower motor disposed proximate to the second inlet;
- the duct extends from proximate to the first blower motor on a first side of the housing toward a second side of the housing that defines in the intake, wherein the duct extends from the second side of the housing toward the second blower motor;
- the duct defines multiple outlets in fluid communication with the vent opening, wherein the multiple outlets are spaced apart along a length of the duct; and
- a condenser disposed within the interior of the housing proximate to the intake and an evaporator disposed within the interior of the housing proximate to the at least one blower motor.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

The various illustrative logical blocks, modules, controllers, and circuits described in connection with the embodiments disclosed herein may be implemented or performed with application specific integrated circuits (ASICs), field programmable gate arrays (FPGAs), general purpose processors, digital signal processors (DSPs) or other logic devices, discrete gates or transistor logic, discrete hardware components, or any combination thereof designed to perform the functions described herein. A general purpose processor may be any conventional processor, controller, microcontroller, state machine or the like. A processor may also be implemented as a combination of computing devices, e.g., a combination of a DSP and a microprocessor, a plurality of microprocessors, one or more microprocessors in conjunction with a DSP core, or any other such configuration.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle, comprising; a vehicle body defining a passenger cabin, wherein the vehicle body includes a roof that defines an aperture; a heating, ventilation, and air conditioning assembly selectively disposed within the aperture, wherein the heating, ventilation, and air conditioning assembly includes: a housing defining an interior, wherein the housing defines a vehicle-forward intake and a vent opening, and wherein the vent opening is in fluid communication with the passenger cabin proximate to the roof; a heating, ventilation, and air conditioning system, wherein the heating, ventilation and air conditioning system includes a fan disposed within the interior of the housing and on an opposing side of the housing relative the vehicle-forward intake, a condenser disposed within the interior of the housing and proximate to the vehicle-forward intake, and an evaporator disposed within the interior of the housing and proximate to the fan; a duct disposed within the interior of the housing to fluidly couple the vehicle-forward intake with the vent opening, wherein the duct defines an outlet in selective fluid communication with the vent opening; a shutter operably coupled to the duct, wherein the shutter is configured to open and close the outlet; a controller communicatively coupled to the heating, ventilation, and air conditioning assembly; and a user interface in communication with the controller, wherein the controller is configured to control the heating, ventilation, and air conditioning system in response to a user input provided to the user interface; and an actuator operably coupled to the shutter, wherein the controller is configured to adjust a position of the shutter via the actuator in response to the user input.

2. The vehicle of claim 1, wherein the heating, ventilation, and air conditioning system includes a compressor, a drier, and an expansion valve.

3. The vehicle of claim 1, wherein the housing includes an exterior bezel defining the vehicle-forward intake and an interior bezel defining the vent opening.

4. The vehicle of claim 1, wherein the heating, ventilation, and air conditioning assembly includes a cover proximate to the vehicle-forward intake, and wherein the cover is operable between an opened position and a closed position to open and close the vehicle-forward intake.

5. The vehicle of claim 4, wherein the heating, ventilation, and air conditioning assembly includes an actuator operably coupled to the cover to move the cover between the opened and closed positions, and wherein the controller is configured to adjust the cover in response to the user input.

6. The vehicle of claim 1, wherein the housing has an inner perimeter that defines a central opening.

7. The vehicle of claim 6, further comprising:
a sunroof coupled to the inner perimeter of the housing and disposed in the central opening.

8. A vehicle roof assembly, comprising: a roof defining an aperture; and a heating, ventilation, and air conditioning assembly selectively disposed within the aperture, wherein the heating, ventilation, and air conditioning assembly includes: a housing defining an interior, wherein the housing defines an intake on a vehicle-forward side of the housing on a first side of the roof, and wherein the housing defines a vent opening on a second side of the roof; at least one blower motor disposed within the interior on a vehicle-rearward side of the housing; a duct disposed within the interior of the housing to fluidly couple the intake with the vent opening, wherein the duct defines at least one outlet in selective fluid communication with the vent opening; at least one shutter operably coupled to the duct, wherein the at least one shutter is configured to open and close the at least one outlet, and an actuator operably coupled to the at least one shutter to adjust a position of the at least one shutter relative to the at least one outlet; a controller communicatively coupled to the actuator; and a user interface communicatively coupled to the controller, wherein the controller adjusts the position of the at least one shutter via the actuator in response to an input received by the user interface.

9. The vehicle roof assembly of claim 8, wherein the duct defines a first inlet and a second inlet, and wherein the at least one blower motor includes a first blower motor disposed proximate to the first inlet and a second blower motor disposed proximate to the second inlet.

10. The vehicle roof assembly of claim 8, wherein the at least one outlet includes a first outlet and a second outlet, and wherein the at least one shutter includes a first shutter and a second shutter, wherein the first shutter is configured to open and close the first outlet and the second shutter is configured to open and close the second outlet.

11. The vehicle roof assembly of claim 8, wherein the housing has an integrated cover configured to open and close the intake.

12. The vehicle roof assembly of claim 8, wherein the vent opening is defined along an inner perimeter of the housing.

13. The vehicle roof assembly of claim 8, wherein the heating, ventilation, and air conditioning assembly further includes:
 a condenser disposed within the housing proximate to the intake; and
 an evaporator disposed within the housing proximate to the at least one blower motor.

14. A vehicle roof assembly, comprising:
 a roof defining an aperture;
 a housing having an outer perimeter configured to engage an edge of the roof defining the aperture and an inner perimeter defining a central opening, wherein the housing defines an intake on a vehicle-forward side of the outer perimeter, and wherein the housing defines a vent opening in fluid communication with the intake;
 a sunroof disposed within the central opening, wherein the vent opening is defined on at least a portion of the inner perimeter of the housing proximate to the sunroof, and wherein the intake is defined on a first side of the sunroof and the vent opening is defined on a second side of the sunroof;
 a fan disposed within the housing and configured to draw air from the intake through an interior of the housing; and
 a duct extending through the interior of the housing and around the sunroof, wherein the duct defines an outlet in fluid communication with the vent opening of the housing.

15. The vehicle roof assembly of claim 14, further comprising:
 an O-ring disposed around the outer perimeter of the housing and configured to form a seal between the housing and the roof.

16. The vehicle roof assembly of claim 14, further comprising:
 a condenser disposed within the interior of the housing proximate to the intake; and
 an evaporator disposed within the interior of the housing on an opposing side relative to the intake.

17. The vehicle roof assembly of claim 14, wherein the fan is disposed within the housing on an opposing side relative to the intake.

18. The vehicle roof assembly of claim 17, wherein the duct defines an inlet disposed proximate to the fan.

\* \* \* \* \*